US 8,645,924 B2

(12) United States Patent
Li et al.

(10) Patent No.: US 8,645,924 B2
(45) Date of Patent: Feb. 4, 2014

(54) LOSSLESS PATH REDUCTION FOR EFFICIENT SYMBOLIC EXECUTION AND AUTOMATIC TEST GENERATION

(75) Inventors: Guodong Li, San Jose, CA (US);
Sreeranga P. Rajan, Sunnyvale, CA (US); Indradeep Ghosh, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 219 days.

(21) Appl. No.: 13/154,274

(22) Filed: Jun. 6, 2011

(65) Prior Publication Data
US 2012/0311545 A1    Dec. 6, 2012

(51) Int. Cl.
*G06F 9/44*    (2006.01)

(52) U.S. Cl.
USPC ........... 717/132; 717/124; 717/131; 717/133; 717/151; 717/154; 717/155; 717/156

(58) Field of Classification Search
None
See application file for complete search history.

(56) References Cited

U.S. PATENT DOCUMENTS

| 6,588,009 | B1 * | 7/2003 | Guffens et al. | 717/161 |
| 2007/0033442 | A1 * | 2/2007 | Tillmann et al. | 714/45 |
| 2008/0301602 | A1 * | 12/2008 | Koelbl et al. | 716/5 |
| 2010/0083233 | A1 * | 4/2010 | Vanoverberghe et al. | 717/126 |
| 2012/0110550 | A1 * | 5/2012 | Ghosh et al. | 717/126 |
| 2012/0110591 | A1 * | 5/2012 | Ghosh et al. | 718/104 |
| 2012/0179935 | A1 * | 7/2012 | Wang et al. | 714/32 |

OTHER PUBLICATIONS

Person et al., "Directed incremental symbolic execution", In Proceedings of the 32nd ACM SIGPLAN conference on Programming language design and implementation (PLDI '11). ACM, New York, NY, USA, 504-515, Jun. 3, 2011.*
Ma et al., "Directed symbolic execution", In Proceedings of the 18th international conference on Static analysis (SAS'11), Eran Yahav (Ed.). Springer-Verlag, Berlin, Heidelberg, 95-111, May 2011.*
Santelices et al., "Exploiting program dependencies for scalable multiple-path symbolic execution", In Proceedings of the 19th international symposium on Software testing and analysis (ISSTA '10). ACM, New York, NY, USA, 195-206, 2010.*
Yang et al., "Efficient and effective branch reordering using profile data", ACM Trans. Program. Lang. Syst. 24, 6 (Nov. 2002), 667-697.*
Fahringer et al., "Symbolic evaluation for parallelizing compilers". In Proceedings of the 11th international conference on Supercomputing (ICS '97). ACM, New York, NY, USA, 261-268. 1997.*
Ikudome, K.; Fox, G.C.; Kolawa, A.; Flower, J.W., "An Automatic and Symbolic Parallelization System for Distributed Memory Parallel Computers," Distributed Memory Computing Conference, 1990., Proceedings of the Fifth , vol. 2, No., pp. 1105,1114, Apr. 8-12, 1990.*
Monica S. Lam and Robert P. Wilson. 1992. Limits of control flow on parallelism. In Proceedings of the 19th annual international symposium on Computer architecture (ISCA '92). ACM, New York, NY, USA, 46-57.*

(Continued)

*Primary Examiner* — Don Wong
*Assistant Examiner* — Adam Conkey
(74) *Attorney, Agent, or Firm* — Baker Botts L.L.P.

(57) ABSTRACT

In one embodiment, symbolically executing a software module having a number of execution paths; and losslessly reducing the number of execution paths during the symbolic execution of the software module.

22 Claims, 8 Drawing Sheets

(56) References Cited

OTHER PUBLICATIONS

Siddiqui, J.H.; Khurshid, S, "ParSym: Parallel symbolic execution," Software Technology and Engineering (ICSTE), 2010 2nd International Conference on , vol. 1, No., pp. V1-405,V1-409, Oct. 3-5, 2010.*

Matt Staats and Corina P\&\#462;s\&\#462;reanu. 2010. Parallel symbolic execution for structural test generation. In Proceedings of the 19th international symposium on Software testing and analysis (ISSTA '10). ACM, New York, NY, USA, 183-194.*

Anand, Saswat et al., "JPF—SE: A Symbolic Execution Extension to Java PathFinder," *TACAS'07 Proceedings of the 13th international conference on Tools and algorithms for the construction and analysis of systems*, 2007.

Boonstoppel, Peter et al., "RWset: Attacking Path Explosion in Constraint-Based Test Generation," *TACAS'08/ETAPS'08 Proceedings of the Theory and practice of software, 14th international conference on Tools and algorithms for the construction and analysis of systems*, 2008.

Cadar, Cristian et al., "KLEE: Unassisted and Automatic Generation of High-Coverage Tests for Complex Systems Programs," *OSDI'08, 8th USENIX Symposium on Operating Systems Design and Implementation*, 2008.

Li, Guodong et al., "Klover: A Symbolic Execution and Automatic Test Generation Tool for C++ Programs," *23rd International Conference on Computer Aided Verification (CAV)*, 2011.

Wong, D. F. et al., "Simulated Annealing for VLSI Design," Kluwer Academic Publishers, Boston/Lancaster/Dordrecht, 1988.

* cited by examiner

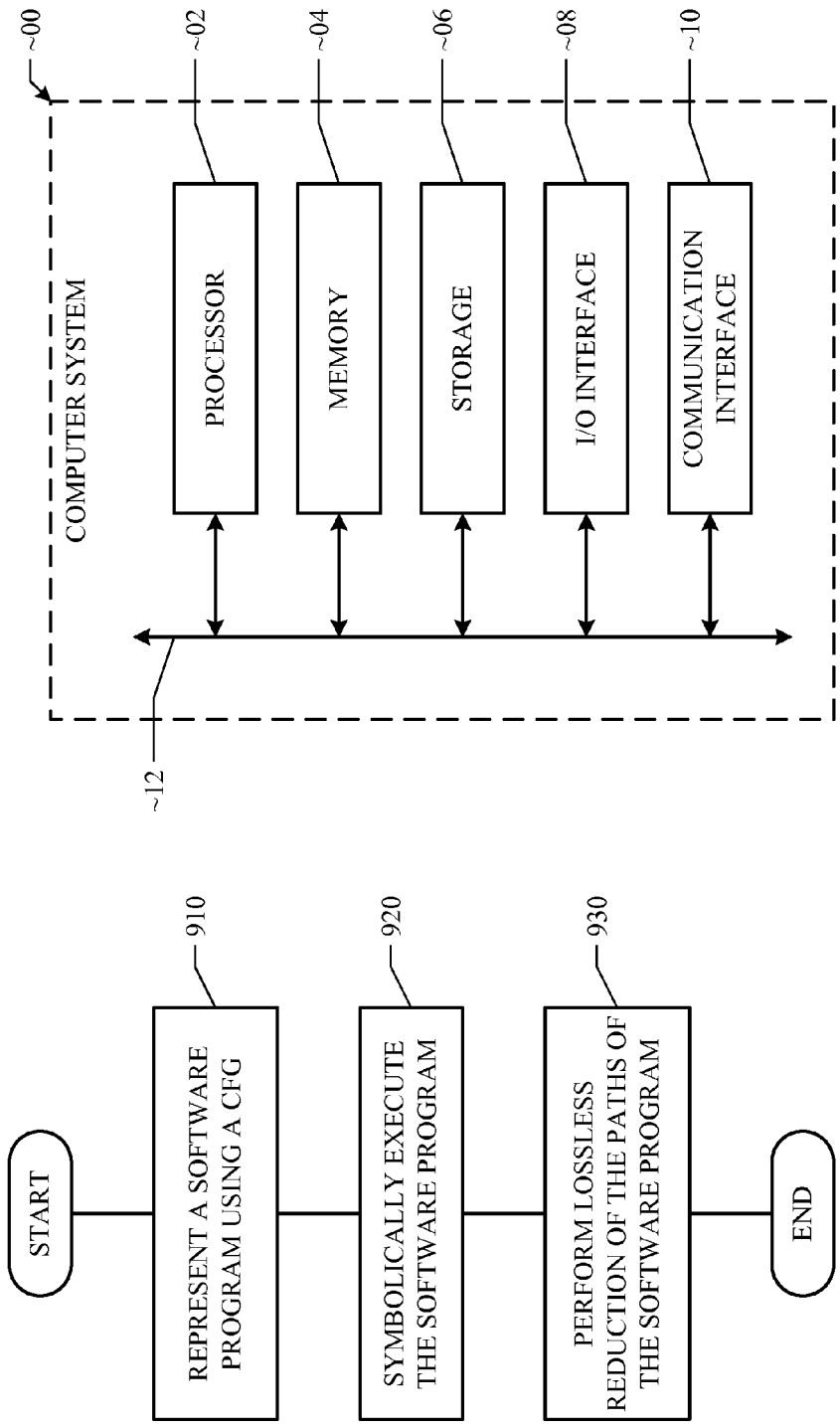

LOSSLESS PATH REDUCTION FOR EFFICIENT SYMBOLIC EXECUTION AND AUTOMATIC TEST GENERATION

TECHNICAL FIELD

This disclosure generally relates to symbolic execution.

BACKGROUND

With the ubiquitous presence of software programs permeating almost all aspects of daily life, validating and verifying software in order to provide robust and reliable software programs has become a necessity. Traditionally, software quality has been assured through manual testing, which may be tedious, difficult, and often gives poor coverage of the source code. More recently, techniques for formally validating software programs have been developed. One such technique is symbolic execution.

Symbolic execution is a non-explicit state model-checking technique that treats input to a software program as symbol variables. It creates complex equations by executing all finite paths in the software program with symbolic variables and then solves the complex equations with a solver, typically known as a decision procedure, to obtain error scenarios, if any. In contrast to explicit state model checking, symbolic execution is able to work out all possible input values and all possible use cases of all possible input values in the software program under analysis. Symbolic execution can be used to automatically generate test inputs with high structural coverage for the program under analysis.

BRIEF DESCRIPTION OF THE DRAWINGS

FIG. 9 illustrates an example method for losslessly reducing the number of paths of a software program during symbolic execution.

FIG. 10 illustrates an example computer system.

DESCRIPTION OF EXAMPLE EMBODIMENTS

Figure 1:
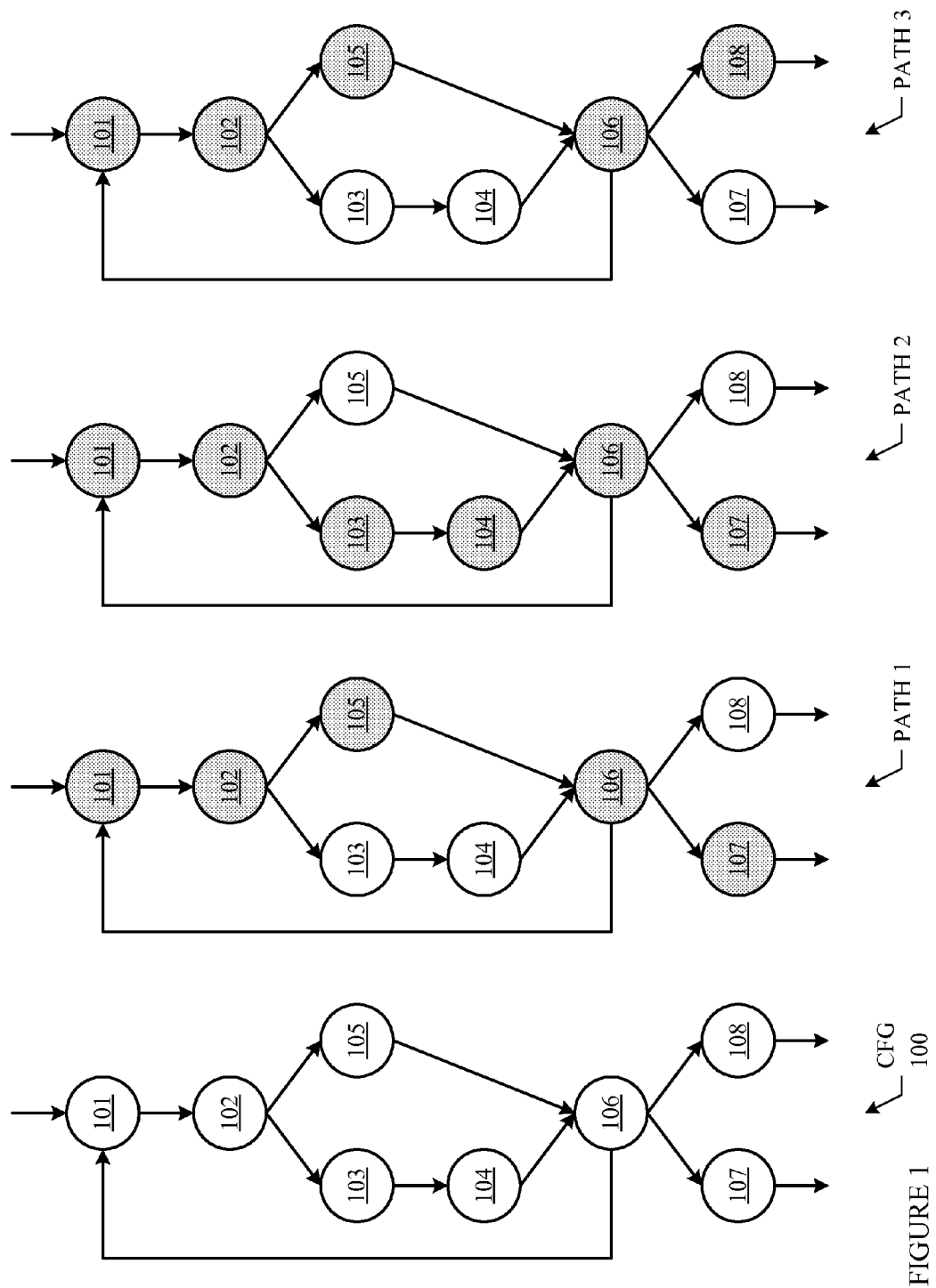
FIG. 1 illustrates an example of run-time coverage monitoring and path pruning.

Symbolic execution may be used to formally validate and test software programs or modules. It is a software analysis technique that performs the execution of a program or module on symbolic rather than concrete inputs. It computes the effect of these symbolic inputs in the program using symbolic expressions. In particular embodiments, symbolic execution characterizes each execution path in the program under analysis it explores with a path condition defined as a conjunction of Boolean expressions. Each Boolean expression denotes one branching decision made during the execution of a distinct path of the program under analysis. When the execution is finished, multiple path conditions may be generated, each corresponding to a feasible execution path of the program code with respect to the symbolic inputs. The solutions to these conditions may be used as the test inputs that assure that the program under analysis runs along a particular concrete path during concrete execution. In particular embodiments, a decision procedure, such as a SMT (Satisfiability Modulo Theory) solver, is used to find the solutions and prune out false paths. If such concrete solutions can be obtained along all true execution paths in a software program or module, then exhaustive testing of the program or module is possible. In addition, during symbolic execution some sanity properties can be checked, such as memory out-of-bound access, divide-by-zero, and certain types of user-defined assertions.

While symbolic execution can exhaustively validate a software program and achieve much more test coverage of program behaviors than traditional testing approaches, it is computationally intensive and requires a significant amount of resources, such as processor power, memory space, etc. For example, symbolic execution often suffers from the path explosion problem (e.g., the executor explores too many unnecessary execution paths and fails to give a set of useful test cases in a reasonable time). Exploring more execution paths than necessary is one of the main bottlenecks making symbolic execution un-scalable. While heuristics can mitigate this problem to some extent, they may harm the test coverage as they are approximation in nature.

To address some of these problems, particular embodiments may losslessly reduce the number of execution paths of a software program or module while symbolically executing the software program or module. Suppose that a software module has a total of n possible execution paths. During the symbolic execution of the module, the n possible execution paths is reduced to m possible execution paths, where m<n, without losing any test coverage on the module (e.g., the lines and branches explored by all n execution paths are still visited even though the total number of execution paths is reduced to m during the symbolic execution of the module). Particular embodiments may reduce the number of execution paths of a software program or module during the symbolic execution of the program or module by reducing duplicate or unnecessary paths without suffering test coverage penalty with respect to the execution paths in the program or module.

The lossless path reduction may be applied to both sequential and concurrent programs in symbolic executors or other symbolic analyzers for programming languages such as, for example and without limitation, C, C++, Java, or other languages. In particular embodiments, the key of a lossless path reduction mechanism is to avoid duplicate execution paths (e.g., those paths that do not contribute to new line or branch coverage). Particular embodiments may detect redundancy and prune useless execution paths on-the-fly during the symbolic execution of a software program (e.g., before the path is actually executed). For example, when a branch of a conditional statement is encountered, if it is known that this branch does not lead to new path coverage, then this branch may be skipped so as to prune all the paths related to it. This may significantly improve the performance of the executor. In addition to the traditional symbolic execution approach, which visits the statements and branches of a program according to the program's control flow, a backward execution approach may be used to identify those paths that are more likely lead to new test coverage.

Given a software program or module, there may be multiple possible execution paths resulting from various types of conditional statements in the source code, such as, for example and without limitation, "if-else", "for", "while", or "case". Considering the following sample code segment that includes an "if-else" statement.

```
1    if (x > 0)
2        y = x + 10;
3    else
4        y = x - 5;
```

In this sample code segment, there are two possible execution paths resulting from the "if-else" conditional statement, depending on the value of variable "x". First, if "x" has a value greater than 0, then line 2 is executed such that "y=x+10". Second, if "x" has a value less than or equal to 0, then line 4 is executed such that "y=x−5". Here, the path condition involves variable "x", and the branching of the path depends on whether "x>0" holds true. This path condition may be denoted as c(x).

As another example, considering the following code segment that includes a "while" loop.

```
1    i = 10;
2    t = 0;
3    while (i > 0) {
4        t = t + i;
5        i--;
6    }
```

In this example, there are ten possible execution paths, one corresponding to each iteration of the "while" loop. Which specific path is executed depends on the value of variable "i". The loop terminates when the value of variable "i" reaches 0. In this case, the path condition involves variable "i" and may be denoted as c(i).

In particular embodiments, the execution paths of a software program or module may be represented using a Control Flow Graph (CFG). A CFG may include a number of nodes and a number of directed edges. Each node may represent a basic code block (e.g., a straight-line piece of code without any jumps or jump targets, with jump targets starting a block and jumps ending a block). Each directed edge may represent a jump in the control flow. FIG. 1 illustrates an example CFG 100 that includes eight nodes 101-108. For example, CFG 100 may represent a code segment in a software program or module. Particular embodiments may use CFGs when performing lossless reductions of execution paths of software programs during symbolic executions.

In a CFG, such as CFG 100 illustrated in FIG. 1, an execution path may begin with the root node (e.g., node 101) and end with a leaf node (e.g., node 107 or node 108). There may be a number of nodes along each execution path. When symbolically executing a specific path, the nodes along that path are visited, and a symbolic expression may be formed, representing the path traversed. In particular embodiments, this symbolic expression may be solved to generate test cases for testing the software program or module along that path.

There are various techniques that may be applied to losslessly reduce the number of execution paths in a software program or module during the symbolic execution of the program or module. Different techniques may be suitable to different code scenarios. Given a specific software program or module, particular embodiments may combine different suitable techniques to losslessly reduce the number of execution paths in the program or module during the symbolic execution of the program. For example, one technique may be applied to one code segment of the program, while another technique may be applied to a different code segment of the program.

Particular embodiments may perform run-time coverage monitoring and path pruning. This technique focuses on search heuristics with reachability analysis and run-time coverage monitoring, and may work well with loops and function calls. In particular embodiments, during the symbolic execution of a software module, when a node or branch is visited along an execution path in the module, it is dynamically recorded (e.g., dynamically marked as "visited"). If a particular path has all of its nodes already visited during the execution of other paths, then this particular path is considered duplicate or redundant and needs not to be executed or visited again. In order to improve performance, particular embodiments may schedule the search order to visit the execution paths in favor of unvisited nodes, especially for loops and function calls.

For example, consider CFG 100 illustrated in FIG. 1. First, PATH 1 is executed. Suppose that PATH 1, starting with node 101 (e.g., the root node of CFG 100), first visits nodes 101, 102, 105, and 106 in sequence. As each of nodes 101, 102, 105, and 106 is visited along PATH 1, it is marked "visited". At node 106, a branching point in CFG 100, node 106 has three possible branches: the first leading back to node 101, the second leading to node 107, and the third leading to node 108. Node 101 has already been visited. Thus, the search is in favor of either node 107 or node 108, which have not yet been visited, rather than node 101. When choosing between multiple unvisited nodes (e.g., nodes 107 and 108), particular embodiments may generally prefer forward branches (e.g., with forward edges) to backward branches (e.g., with backward edges). In addition, particular embodiments may prefer those branches that lead to paths with higher percentage of unvisited nodes. Suppose that PATH 1 selects node 107, and node 107 is marked as "visited". It then terminates at node 107.

Next, PATH 2 is executed. PATH 2, starting again with node 101, first visits nodes 101 and 102. At node 102, another branching point in CFG 100, there are two possible branches: the first leading to node 103, and the second leading to node 105. However, node 105 has already been visited along PATH 1. Thus, PATH 2 may decide that the next node to visit is node 103, which has not yet been visited. PATH 2 may visit nodes 103, 104, and 106 in sequence, and nodes 103 and 104 are now marked as "visited". Suppose that from node 106, PATH 2 can only go to node 107 under the constraint of the current path condition. It then terminates at node 107.

Next, PATH 3 is executed. Starting with node 101, PATH 3 first visits nodes 101 and 102. At node 102, it randomly pick node 103 or node 105 to visit next, because both nodes 103 and 105 have already been visited along PATHS 1 and 2. At node 6, suppose that all the three branches are feasible. Since node 108 has not yet been visited, PATH 3 visits node 108 as this node leads to new branch coverage. It then terminates at node 108.

During such a process, particular embodiments may record the coverage information and perform reachability analysis, which may require intra-procedural analysis, to determine the next branch or path to visit. Such information can also be used by more advanced search schemes, such as those based on genetic algorithms or artificial intelligence (AI) algorithms. The more accurate a search algorithm picks the right branches, the fewer execution paths are visited, and hence the fewer test cases are be generated.

Note that for CFG 100, after PATHS 1, 2, and 3, all the nodes have been visited. Thus, even though CFG 100 has additional possible execution paths, these additional paths do not need to be executed. For example a fourth path may include nodes 101, 102, 103, 104, 106, and 108 in sequence; and a fifth path may include nodes 101, 102, 105, 106, 101, 102, 103, 104, 106, and 107 in sequence. However, these paths are redundant and need not to be executed.

In particular embodiments, when a path contains no unvisited nodes, it is skipped (e.g., not executed). However, in some cases, some nodes may never be visited during the entire symbolic execution (e.g., none of the paths visit them). Such nodes may be referred to as "coverage holes". If a redundant path contains one of such unvisited nodes that are coverage holes, particular embodiments do not rule out (i.e., skip) this redundant path. To address this problem with coverage holes, particular embodiments may apply dependency analysis to determine which paths should be considered.

For example, suppose that a coverage hole (e.g., a unvisited node) is associated with a path condition pc, and the set of symbolic variables pc involves is S. For an execution path under consideration, if its path condition involves no variable in S, then this pat may be safely ignored. Thus, particular embodiments can calculate the set of symbolic variables (e.g., S') from the current program point to a coverage hole. If S∩S'={ }, then the path may be discarded.

Figure 2:
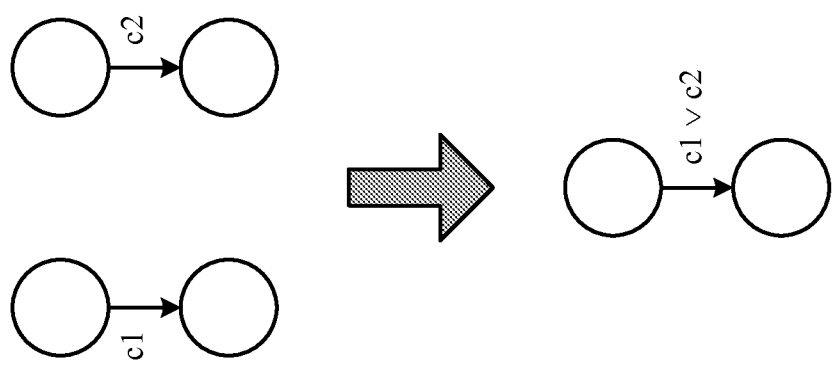
FIG. 2 illustrates an example of path merging.

Particular embodiments may merge execution paths. During the exploration, particular embodiments may merge the path conditions of multiple visited states. For example, suppose that STATE 1 with path condition c1 and STATE 2 with path condition c2 have been visited, then these two states may be merged into one with path condition c1 ∨ c2. This concept is illustrated in FIG. 2. This path merging may reduce the number of states and paths; however, it may increase the solving time since the combined path condition becomes more complicated. To mitigate this problem, particular embodiments may apply more aggressive simplifications on the combined path condition (e.g., use simplification rules and SMT/SAT solving to derive simpler forms as in predicate abstraction).

Figure 3:
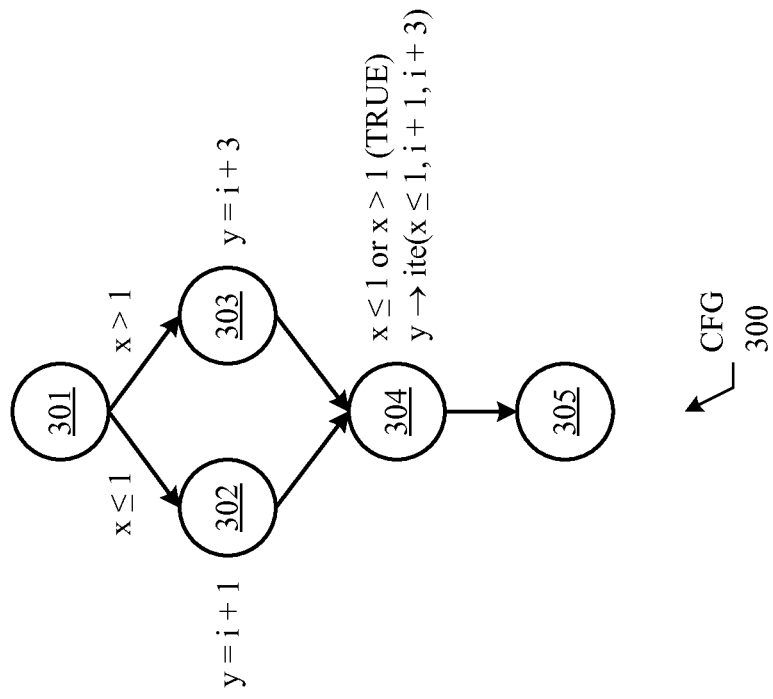
FIG. 3 illustrates an example of path merging.

To further illustrate path merging, consider the example illustrated in FIG. 3. Suppose that the symbolic state is represented as a pair (C, σ), where C is the path condition denoting the conjunction of all guards occurring in the current path, and σ is a mapping from program variables to their symbolic values. In CFG 300 illustrated in FIG. 3, node 301 is a fork node (i.e., a branching point) with two branches marked with path conditions. If the value of variable "x" is less than or equal to 1, then one path leads to node 302. On the other hand, if the value of variable "x" is greater than 1, then another path leads to node 303. Nodes 302 and 303 contain assignments to variable "y". After visiting node 302, the symbolic state becomes "(x≤1, y↦ i+1)". Similarly, the symbolic state after node 303 is visited becomes "(x>1, y↦ i+3)". After node 304, a join node, is visited, instead of keeping the two separate paths, the two paths may be merged such that the path condition becomes "x≤1 or x>1", which may be symbolically evaluated to TRUE, and the symbolic value map becomes y↦ ite(x≤1, i+1, i+3). The term "ite" stands for "if-then-else". In particular embodiments, when two paths are merged into one path, their corresponding symbolic expressions are combined into a single symbolic expression (e.g., using "ite").

It is possible to simplify the expressions during path merging. For example, consider the following example program that consists of two conditional statements.

| 1 | if (v0 > 1) |
| 2 |    y = v1; |
| 3 | else |
| 4 |    y = v2; |
| 5 | if (y > v1) |
| 6 |    z = v2 + 1; |
| 7 | else |
| 8 |    z = y + 1; |

After the symbolic execution of these statements, a symbolic value map may be obtained that stores the symbolic values of variables "y" and "z" in terms of the input values. To express "z" in terms of input values, "y" may be substituted with its symbolic value to obtain a long expression containing three "ite" (i.e., if-then-else) expressions for "z". This long expression can be simplified to "v2+1" with respect to the semantics of the "ite" structure. The following summarizes the simplification for "z".

Symbolic value map:
y → ite(v0 > 1, v1, v2)
z → ite(y > v1, v2 + 1, y + 1)
⇓
Merge and substitute:
z → ite(ite(v0 > 1, v1, v2) > v1, v2 + 1, ite(v0 > 1, v1, v2) + 1)
⇓
Simplify:
z → v2 + 1

In particular embodiments, such simplification may help ameliorate the expression blow-up problem.

Particular embodiments may prune duplicate paths using SMT based analysis. In particular embodiments, whether a path is superfluous is determined by sophisticated decision procedures such as SMT solving. For example, suppose that PATH 1, with path condition c1, and PATH 2, with path condition c2, have been visited. Then PATH 3, whose current path condition is c3, can be skipped if c1 ∨ c2=c3. This can be applied during path merging.

Particular embodiments may perform de-sequentialization using dependency analysis. In particular embodiments, when two execution branches (e.g., branch b1 and branch b2) have some symbolic variables in common, they are considered dependent. For example, if a variable is an array, and an element of this array is accessed by two branches, then these two branches are considered dependent. Particular embodiments may prune duplicate paths associated with independent branches (e.g., branches that do not share any common symbolic variable and thus are not dependent on each other).

Figure 4:
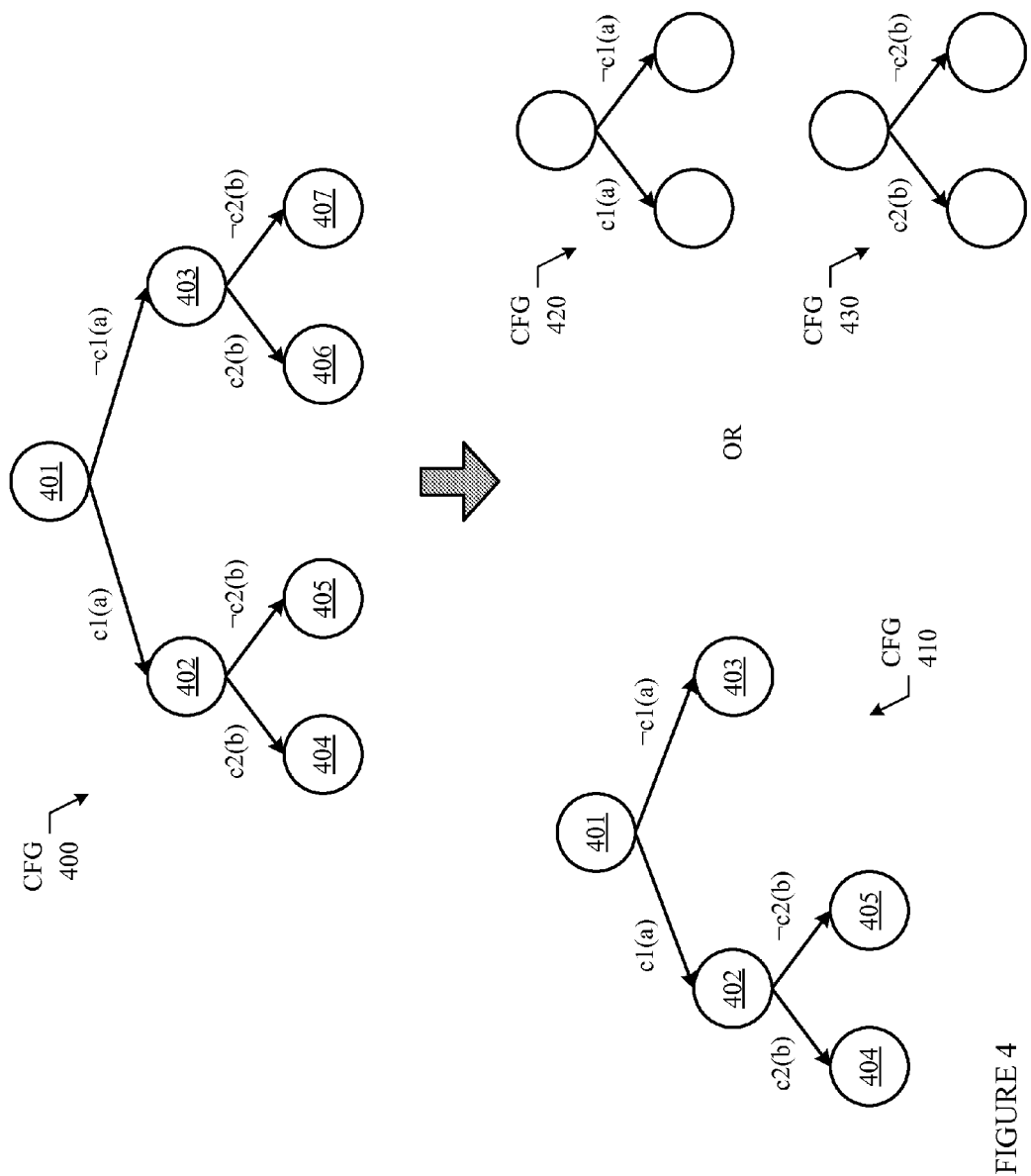
FIG. 4 illustrates an example of de-sequentialization using dependency analysis.

FIG. 4 illustrates an example of pruning duplicate paths associate with independent branches. In this case, CFG 400 has four possible execution paths. At node 401, a branching point, there are two branches depending on path condition c1(*a*), which involves variable "a". At node 402, another branching point, there are two branches depending on path condition c2(*b*), which involves variable "b". Similarly, at node 403, a third branching point, there are two branches depending on path condition c2(*b*), which involves variable "b". The four execution paths of CFG 400, therefore, are: (1) nodes 401, 402, and 404; (2) nodes 401, 402, and 405; (3) nodes 401, 403, and 406; and (4) nodes 401, 403, and 407. Since a b, the four paths of CFG 400 result from enumerating all the combinations of c1(*a*), ¬c1(*a*), c2(*b*), and ¬c2(*b*). The branches at node 401 and the branches at nodes 402 and 403 are independent of each other because they do not share any common symbolic variable. Therefore, the four paths of CFG 400 may be reduced to three paths of CFG 410 or CFGs 420 and 430. For example, with CFG 410, the branch based on path condition c2(b) is only executed once, and thus the three paths of CFG 410 are: (1) nodes 401, 402, and 404; (2) nodes 401, 402, and 405; and (3) nodes 401 and 403. With CFGs 420 and 430, the branches based on path conditions c1(a) and c2(b) are parallelized into two separate parts.

Sometimes, path explosion can be attributed to the sequential composition of independent branches. In particular embodiments, a sequential composition of two branches in a CFG occurs when one of the two branches follows the other one of the two branches in the CFG. For example, with CFG 400, the branches at nodes 402 and 403 follow the branches at node 401 (i.e., proceed in sequence). Particular embodiments may decouple these branches and replace their sequential composition with a equivalent parallel composition. That is, the sequential composition is converted into equivalent parallel composition. This process may be called "de-sequentialization."

To further illustrate the de-sequentialization process, consider the following sample C program.

```
1    void foo(char* x, char c, char d) {
2        for (int j = 0; j < 10; j++) {
3            if (x[j]++ > c)         // branch 1
4                printf ("Case 1\n");
5            else                    // branch 2
6                printf("Case 2\n");
7        }
8        if (x[2] > d)               // branch 3
9            printf("Case 3\n");
10       else                        // branch 4
11           printf("Case 4\n");
12   }
```

With this sample function "foo", first, the "for" loop (lines 2-7) is executed ten times. There is a branch during each iteration of the loop, caused by the "if-else" statement (lines 3-6) inside the loop, depending on whether "x[j]++>c" holds. Next, the "if-else" statement (lines 8-11) after the "for" loop is executed, causing another branch, depending on whether "x[2]>d" holds. Without any optimization, the execution of "foo" generates up to $2^{11}=2048$ paths.

In particular embodiments, de-sequentialization based on dependency analysis can help to reduce this number. In the above example, condition c2 at line 8 (i.e., "x[2]>d") involves variables (or array elements) "x[2]" and "d". Condition c1 at line 3 (i.e., "x[j]++>c") involves variables "x", "j", and "c". Condition c2 depends on condition c1 only when "j=2". Thus, the above function "foo" is equivalent to the following, more parallelized code.

```
1    switch (a) { // a is a symbolic variable
2        case 0: {
3            for (int j = 0; j < 2; j++) {
4                if (x[j]++ > c)
5                    printf("Case 1\n");
6                else
7                    printf("Case 2\n");
8            }
9        }
10       case 1: {
11           if (x[2]++ > c)
12               printf("Case 1\n");
13           else
14               printf("Case 2\n");
15           if (x[2] > d)
16               printf("Case 3\n");
17           else
18               printf("Case 4\n");
19       }
20       default: {
21           for (int j = 3; j < 10; j++) {
22               if (x[j]++ > c)
23                   printf("Case 1\n");
24               else
25                   printf("Case 2\n");
26           }
27       }
28   }
```

In the above code segment, "case 1" (lines 10-19) corresponds to when "j=2". This is the only case when condition c2 depends on condition c1. In particular embodiments, the dependent cases may be grouped together, while the independent cases may be executed in parallel. The parallelized code may produce up to $4+4+2^7=136$ paths without sacrificing coverage. Moreover, the last "for" loop (lines 21-27) may be further de-sequentialized to reduce the total number of paths to 22 while keeping all the coverage.

In particular embodiments, the above code segment may be executed by a symbolic executor implicitly (e.g., instead of explicitly converting the original "foo" function into another function, such as the above more parallelized code segment, the executor may visit the nodes in a way similar to performing the conversion at run-time). The executor may detect dependent and independent path conditions based on variable dependency analysis during run-time, and schedule the execution to control parallelization (e.g., schedule independent paths in parallel).

Particular embodiments may perform branch order reduction. Suppose that the path condition of PATH 1 is p', c1, c2, . . . ; and the path condition of PATH 2 is p', c2, c1, . . . . In addition, the symbolic value maps of the two paths are congruent such that the variables have the same values. In this case, particular embodiments may consider PATH 2 as a duplicate of PATH 1 and should be eliminated. In other words, when the path condition of a path p is a permutation of that of another visited path, p can be skipped.

Particular embodiments may use branch schedule to avoid producing too many paths in the earlier phases of symbolic execution. Particular embodiments may adjust the order of the branches during symbolic execution. For example, a first branch may be moved above a second branch in a CFG so that the first branch is executed before the second branch. In particular embodiments, the related branches are grouped together in the hopes of cutting paths earlier, and the execution of irrelevant branches may be delayed.

Figure 5:
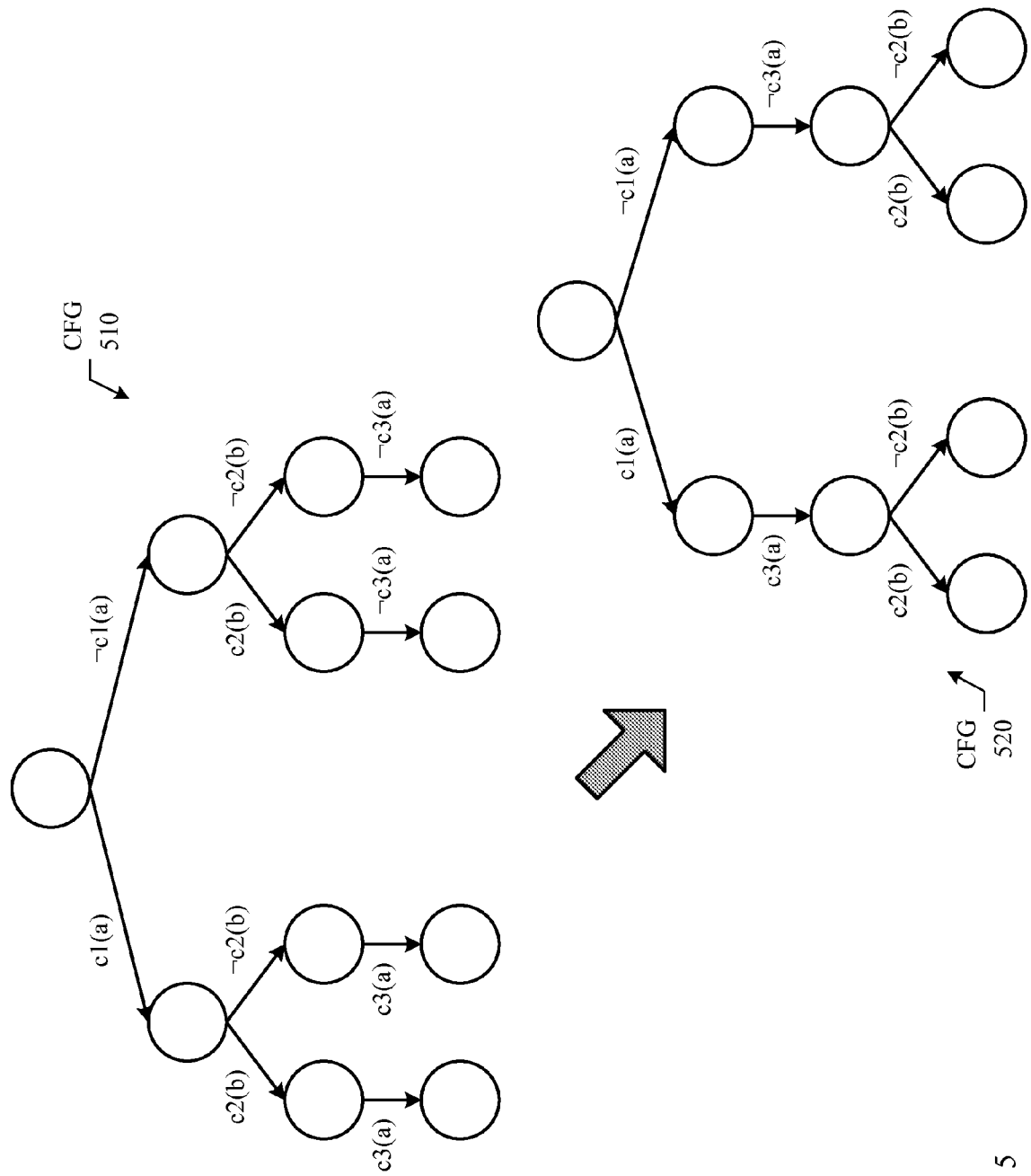
FIG. 5 illustrates an example of reordering branches to reduce the number nodes in a Control Flow Graph.

FIG. 5 illustrates an example of recording branches to reduce the number of nodes in a CFG. In this case, for CFG 510, path conditions c1(a) and c3(a) both relate to variable a; whereas path condition c2(b) relates to variable b. Thus, path conditions c1(a) and c3(a) are grouped together by moving branch c3 ahead of (e.g., above) branch c2, as illustrated with CFG 520. This reordering of the branches reduces the number of nodes from 11 in CFG 510 to 9 in CFG 520.

Figure 6:
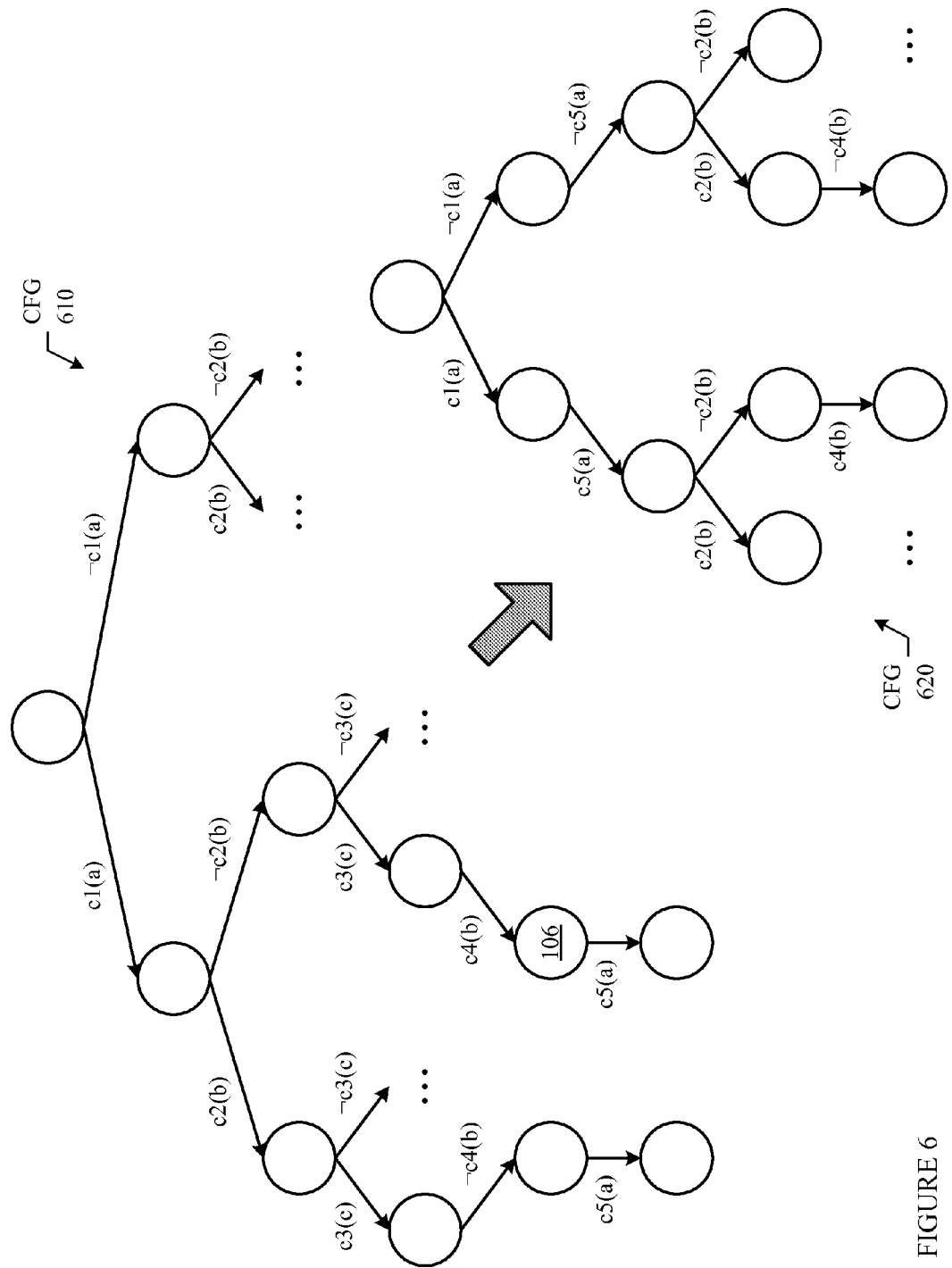
FIG. 6 illustrates an example of reordering branches to reduce the number nodes in a Control Flow Graph.

FIG. 6 illustrates a more complicated example. With CFG 610, path conditions c1(a) and c5(a) both relate to variable a. By advancing branch c5 and delaying branch c3 (i.e., by moving branch c5 above branch c3), as illustrated with CFG 620, the space state is reduced from 31 nodes of CFG 610 to 19 nodes of CFG 620. In some case, this may be considered as a mutant of a special case of de-sequentialization, but it does not need to parallelize the branch execution.

Particular embodiments may perform backward symbolic execution. Traditional symbolic execution goes in a forward manner: the current instruction or statement is executed to generate a new state, and then the next one in the program is executed. One of the main problems of forward execution is that at the current execution point, it knows little about the subsequent executions. For example, when executing a path, it does not know for sure whether this path can result in new coverage (e.g., lead to any unvisited node) because it can only get this knowledge after the execution of the path terminates. Using heuristics may be helpful, but existing methods may fail to quickly identify the uncovered nodes and branches. Thus, particular embodiments may perform backward symbolic execution to ensure that each attempted path actually covers at least one new node or branch.

The lossless reduction techniques described above may be applied to either the traditional forward approach or this backward approach. In particular embodiments, back symbolic execution may be combined with the techniques described above (e.g., with run-time coverage monitoring and de-sequentialization) to further enhance the efficiency.

Figure 7:
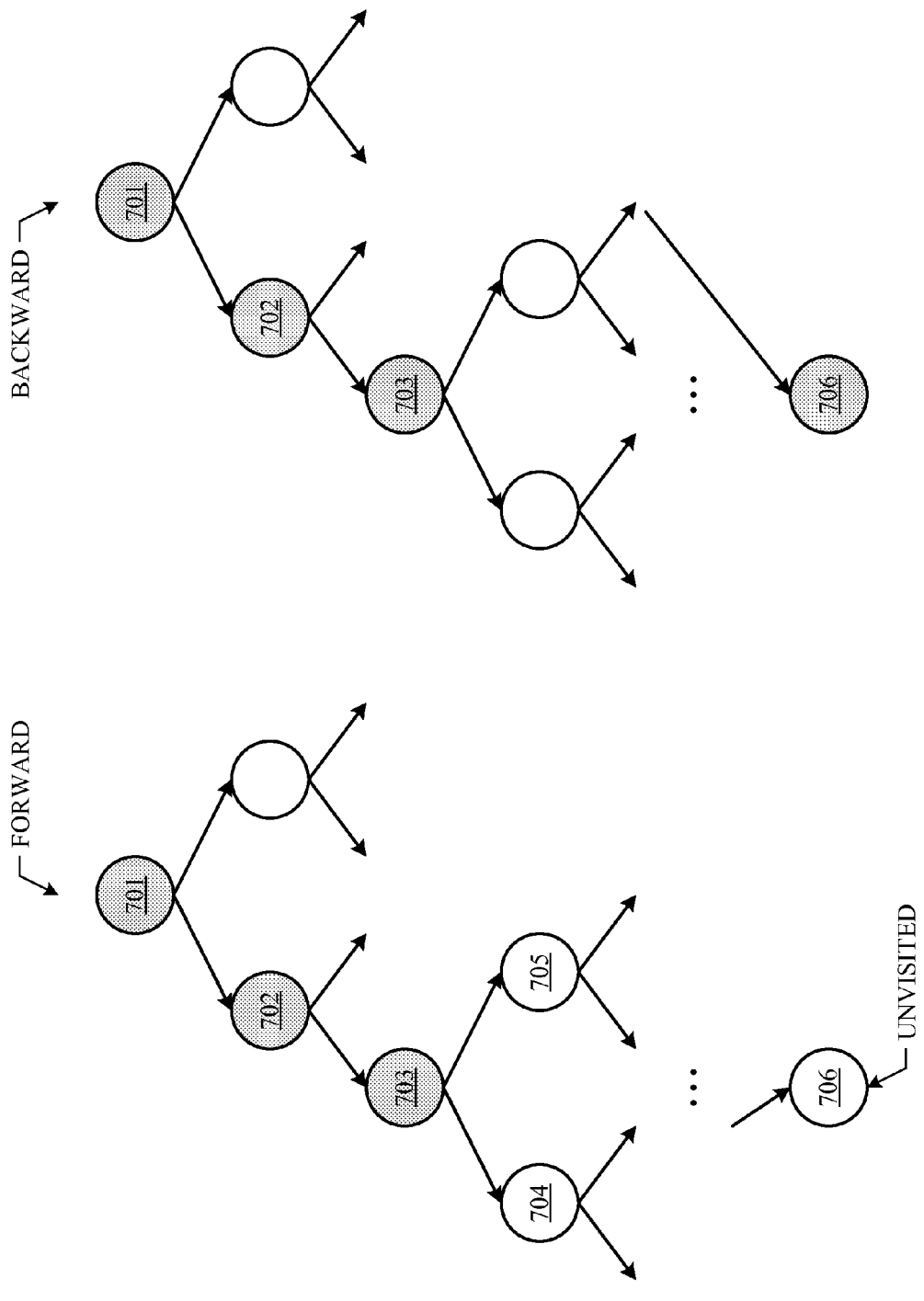
FIG. 7 illustrates an example comparison between forward and backward symbolic execution.

FIG. 7 illustrates an example comparison between forward and backward symbolic execution. With forward symbolic execution, a path may proceed along nodes 701, 702, 703, 704, . . . (e.g., begin with the root node and end with a leaf node); and another path may proceed along nodes 701, 702, 703, 705, . . . . With the forward approach, it cannot be ensured that a particular path can eventually lead to node 706. In contrast, with backward symbolic execution, it starts with a unvisited node and proceeds backward through the CFG to the initial node (e.g., the root node). For example, since node 706 is a unvisited node, the execution may start with node 706 and proceed backward through the CFG to node 701. This ensures that the unvisited node 706 is covered with the path thus formed.

Figure 8:
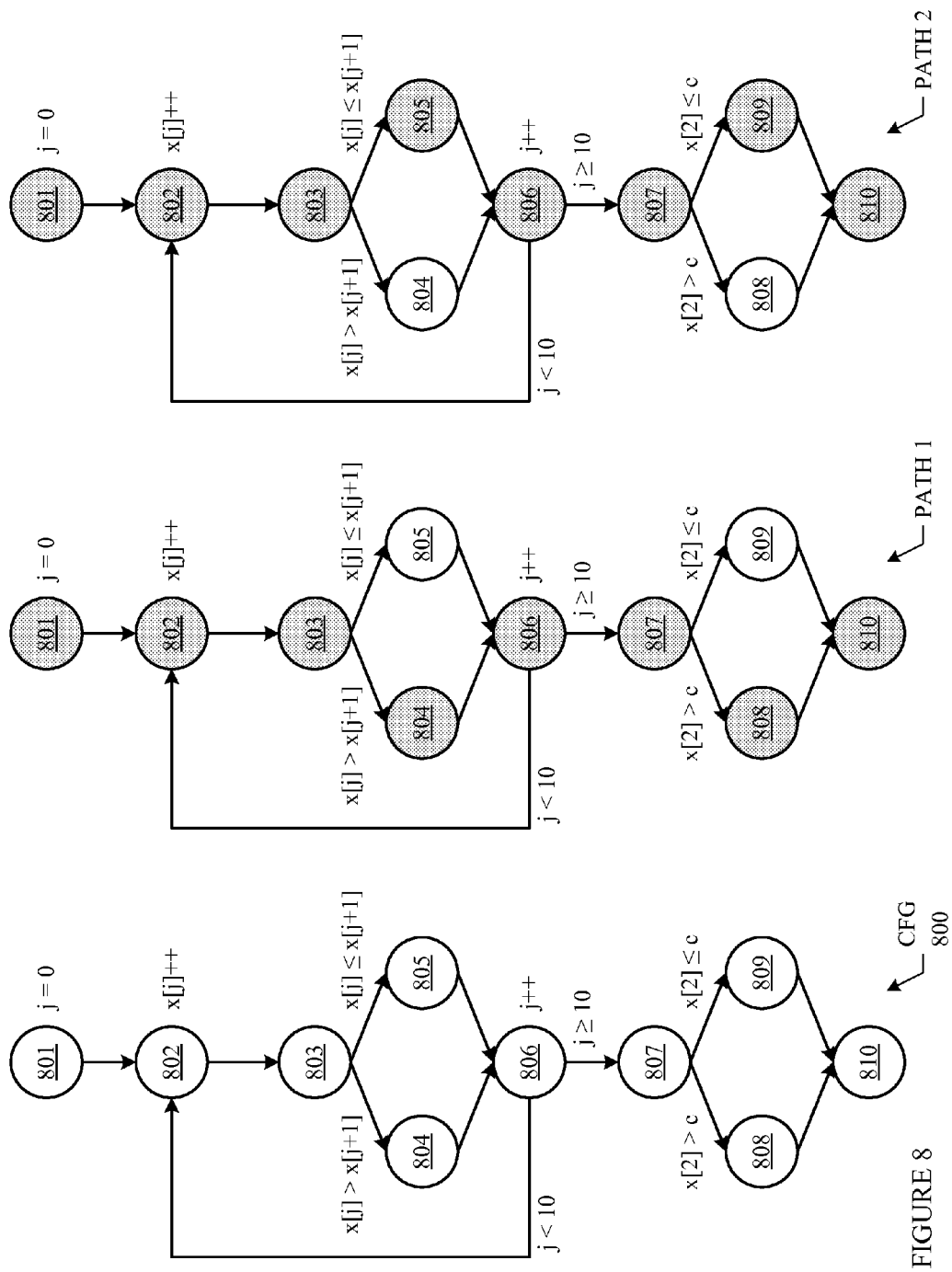
FIG. 8 illustrates an example of backward symbolic execution.

As another example, consider the following sample program whose corresponding CFG 800 is shown in FIG. 8.

| 1 | void foo(char* x, char c) { | |
|---|---|---|
| 2 | for (int j = 0; j < 10; j++) { | |
| 3 | x[j]++; | |
| 4 | if (x[j] > x[j+1]) | // branch 1 |
| 5 | printf("Case 1\n"); | |
| 6 | else | // branch 2 |
| 7 | printf("Case 2\n"); | |
| 8 | } | |
| 9 | if (x[2] > c) | // branch 3 |
| 10 | printf("Case 3\n"); | |
| 11 | else | // branch 4 |
| 12 | printf("Case 4\n"); | |
| 13 | } | |

In this case, when "foo" is executed, first the "for" loop (lines 2-8) is executed ten times. There is a branch during each iteration of the loop, caused by the "if-else" statement (lines 4-7) inside the loop, depending on whether "x[j]>x[j+1]" holds. Next, the "if-else" statement (lines 9-12) after the "for" loop is executed, causing another branch, depending on whether "x[2]>c" holds.

Consider a backward symbolic execution starting from the last node 810 (currently unvisited) of CFG 800, as illustrated with PATH 1. Since both of node 810's predecessors (i.e., nodes 808 and 809) are unvisited, either one of them may be picked during the first path. Suppose that node 808 is picked with path condition "x[2]>c". Next, node 808's predecessor node 807 is visited, followed by node 806. Before visiting node 806, the path condition is "x[2]>c ∧ j≥10". After visiting node 806, the path condition becomes "x[2]>c ∧ j≥9", since node 806 performs the operation "j++" (a part of the "for" loop at line 2). Node 806 has two predecessors, node 804 and node 805, and neither has been visited and either may be picked. Suppose that node 804 is picked. The path condition now becomes "x[2]>c ∧ j≥9 ∧ x[j]>x[j+1]". Nodes 803 and 802 are then visited in order. Node 802 contains a side-effect statement "x[j]++", which turns the path condition into "x[2]>c ∧ j 9 ∧ x[j]−1>x[j+1]". Node 802 has two predecessors: node 801 and node 806. The path to node 801 is infeasible because it requires "j=0" while currently "j≤9". Thus, node 806 is visited again, followed by nodes 804 and 803 and back to node 802. This loop procedure continues until "j" becomes 0, where the path condition, after simplification, becomes "x[2]>c ∧ x[0]−1>x[1] ∧ x[1]−1>x[2] ∧ x[2]−1>x[3] ∧ . . . ". Solving this constraint may give a test case. As illustrated in FIG. 8, PATH 1 consists of nodes 810, 808, 807, 806, 804, 803, 802, and 801. After PATH 1, the unvisited nodes are node 809 and node 805. Since the traversal goes in a reverse order, the next path, PATH 2, starts with node 809, which is the last unvisited node in CFG 800 (e.g., a unvisited node that is closest to a leaf node). The execution is similar to that of PATH 1 described above. At node 806, since node 805 has not been visited, PATH 2 may proceed toward node 805 by taking the branch "x[j]≤x[j+1]" at node 806.

With just two paths, all the nodes in CFG 800 are covered (i.e., visited). One of the advantages of the backward symbolic execution technique is that each of its node selections is on a real unvisited node; thus, each new path formed with this technique always brings new node or branch coverage, provided that this path is feasible. In contrast, the forward approach may still visit duplicate paths without contributing new coverage. In particular embodiments, during forward execution, it may be helpful to also apply backward traversal to a limited extend so as to locate the best candidate paths to try next. Their combination may help find a sufficient set of paths in less time. For example, for those nodes that are easy to cover, forward execution may be applied. For those nodes that are difficult to cover, backward execution may be applied to ensure that such nodes are visited along some path.

Sometimes, backward execution may be more difficult than forward execution, as it has less information about the variables flowing into the program. Backward execution updates the symbolic expressions in a different way than forward execution. For example, consider node 806, which corresponds to the operation "j++". With forward execution, if before node 806, the path condition on variable "j" is c(j), then going forward after node 806, the path condition on variable "j" becomes c(j+1). However, with backward execution, if before node 806, the path condition on variable "j" is c(j), then going backward after node 806, the path condition on variable "j" becomes c(j−1).

FIG. 9 illustrates an example method for losslessly reducing the number of paths of a software program or module during symbolic execution. Particular embodiments may represent a software program using a CFG, as illustrated in STEP 910. The program may have a number of possible execution paths. Particular embodiments may symbolically execute the program, as illustrated in STEP 920. During the symbolic execution of the program, particular embodiments may perform lossless reduction on the paths of the program, as illustrated in STEP 930. To losslessly reduce (i.e., reducing the number of paths of the program without suffering coverage) the paths in the program, one or more of the lossless path reduction techniques described above may be applied. Multiple techniques may be combined to produce better results. For example, one technique may be applied to one portion of the program while another technique may be applied to a different portion of the program.

In particular embodiments, the symbolic expressions obtained by symbolically executing the software program or module may be solved using, for example, a SMT solver. The solutions, if any, may be used to generate test cases for testing and validating the software program or module.

In particular embodiments, the lossless path reduction techniques described above may be implemented as computer software stored in non-transient computer-readable storage medium. Particular embodiments may be implemented on one or more computer systems. FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices, symbolically executing a software module having a number of execution paths;
    losslessly reducing the number of execution paths during the symbolic execution of the software module; and
    representing the software module using a Control Flow Graph;
    wherein losslessly reducing the number of execution paths during the symbolic execution of the software module comprises:
        identifying a first path condition and a second path condition forming a sequential composition in the Control Flow Graph;
        performing dependency analysis for the first path condition and the second path condition;
        determining that the first path condition and the second path condition are independent of each other; and
        based on the determination that first path condition and the second path condition are independent of each other:
            converting the sequential composition into an equivalent parallel composition of the first path condition and the second path condition; and
            ignoring any duplicate path in the parallel composition.

2. The method of claim 1, wherein losslessly reducing the number of execution paths during the symbolic execution of the software module further comprises:
    traversing a first execution path through the Control Flow Graph, comprising:
        recording each node that has been visited along the first execution path; and
        at each branching node along the first execution path, selecting a branch that leads to a unvisited node before selecting a branch that leads to a visited node; and
    ignoring a second execution path through the Control Flow Graph where all nodes along the second execution path have been visited.

3. The method of claim 1, wherein losslessly reducing the number of execution paths during the symbolic execution of the software module further comprises:
    merging a first execution path and a second execution path through the Control Flow Graph into a single third execution path using a decision procedure;
    using native constructs in the decision procedure to combine a first symbolic expression representing the first execution path and a second symbolic expression representing the second execution path into a single third symbolic expression representing the third execution path; and
    modeling the first execution path and the second execution path through the native constructs and through built-in theories of the design procedure.

4. The method of claim 1, wherein losslessly reducing the number of execution paths during the symbolic execution of the software module further comprises:
    identifying a first path condition and a second path condition that are related to each other in the Control Flow Graph through symbolic analysis of the first path condition and the second path condition, yielding a dependency between the first path condition and the second path condition;
    grouping a first branch resulting from the first path condition and a second branch resulting from the second path condition by moving the second branch ahead of a third branch located between the first branch and the second branch;
    determining the feasibility of a path condition of the second branch over a path condition of the first branch; and
    pruning execution paths before execution of the third branch.

5. The method of claim 1, wherein losslessly reducing the number of execution paths during the symbolic execution of the software module further comprises:
    identifying a unvisited node in the Control Flow Graph;
    identifying an execution path through the Control Flow Graph by traversing backward, instruction-by-instruction, through the Control Flow Graph, starting at the unvisited node and ending at a root node of the Control Flow Graph;
    interpreting, through variable substitution, each instruction encountered during the traversing backward; and
    updating the heap, stack and path conditions with the symbolic expressions obtained through the variable substitution.

6. The method of claim 1, wherein during the symbolic execution of the software module, the number of execution paths is reduced without losing coverage of the software module.

7. The method of claim 1, wherein losslessly reducing the number of execution paths during the symbolic execution of the software module further comprises:
    performing dependency analysis and coverage target analysis for the first path condition and the second path condition;

determining whether the first path condition and the second path condition share no variables;

determining whether the a first branch and a second branch lead to different coverage targets, the first branch resulting from the first path condition and the second branch resulting from the second path condition;

determining that the first path condition and the second path condition are independent of each other based upon a determination that the first path condition and the second path condition share no variables or upon a determination that the first path condition and the second path condition lead to different coverage targets;

based on the determination that the first path condition and the second path condition are independent of each other:

converting the sequential composition into an equivalent parallel composition of the first path condition and the second path condition by scheduling the first branch and the second branch to execute in parallel;

refactoring source code of the program by placing code pieces of the first branch and the second branch into separate execution units; and executing the code related to the first branch separately from the code related to the second branch.

8. A system comprising:

a memory comprising instructions executable by one or more processors; and the one or more processors coupled to the memory and operable to execute the instructions, the one or more processors being operable when executing the instructions to:

symbolically execute a software module having a number of execution paths;

losslessly reduce the number of execution paths during the symbolic execution of the software module; and represent the software module using a Control Flow Graph;

wherein losslessly reducing the number of execution paths during the symbolic execution of the software module comprises:

identifying a first path condition and a second path condition forming a sequential composition in the Control Flow Graph;

performing dependency analysis for the first path condition and the second path condition;

determining that the first path condition and the second path condition are independent of each other; and based on the determination that the first path condition and the second path condition are independent of each other:

converting the sequential composition into an equivalent parallel composition of the first path condition and the second path condition; and ignoring any duplicate path in the parallel composition.

9. The system of claim 8, wherein losslessly reducing the number of execution paths during the symbolic execution of the software module further comprises:

traversing a first execution path through the Control Flow Graph, comprising:

recording each node that has been visited along the first execution path; and at each branching node along the first execution path, selecting a branch that leads to a unvisited node before selecting a branch that leads to a visited node; and ignoring a second execution path through the Control Flow Graph where all nodes along the second execution path have been visited.

10. The system of claim 8, wherein losslessly reducing the number of execution paths during the symbolic execution of the software module further comprises:

merging a first execution path and a second execution path through the Control Flow Graph into a single third execution path using a decision procedure;

using native constructs in the decision procedure to combine a first symbolic expression representing the first execution path and a second symbolic expression representing the second execution path into a single third symbolic expression representing the third execution path; and modeling the first execution path and the second execution path through the native constructs and through built-in theories of the design procedure.

11. The system of claim 8, wherein losslessly reducing the number of execution paths during the symbolic execution of the software module further comprises:

identifying a first path condition and a second path condition that are related to each other in the Control Flow Graph through symbolic analysis of the first path condition and the second path condition, yielding a dependency between the first path condition and the second path condition;

grouping a first branch resulting from the first path condition and a second branch resulting from the second path condition by moving the second branch ahead of a third branch located between the first branch and the second branch;

determining the feasibility of a path condition of the second branch over a path condition of the first branch; and pruning execution paths before execution of the third branch.

12. The system of claim 8, wherein losslessly reducing the number of execution paths during the symbolic execution of the software module further comprises:

identifying a unvisited node in the Control Flow Graph;

identifying an execution path through the Control Flow Graph by traversing backward, instruction-by-instruction, through the Control Flow Graph, starting at the unvisited node and ending at a root node of the Control Flow Graph;

interpreting, through variable substitution, each instruction encountered during the traversing backward; and updating the heap, stack and path conditions with the symbolic expressions obtained through the variable substitution.

13. The system of claim 8, wherein during the symbolic execution of the software module, the number of execution paths is reduced without losing coverage of the software module.

14. The system of claim 8, wherein losslessly reducing the number of execution paths during the symbolic execution of the software module further comprises:

performing dependency analysis and coverage target analysis for the first path condition and the second path condition;

determining whether the first path condition and the second path condition share no variables;

determining whether the a first branch and a second branch lead to different coverage targets, the first branch resulting from the first path condition and the second branch resulting from the second path condition;

determining that the first path condition and the second path condition are independent of each other based upon a determination that the first path condition and the second path condition share no variables or upon a determination that the first path condition and the second path condition lead to different coverage targets;

based on the determination that the first path condition and the second path condition are independent of each other:
converting the sequential composition into an equivalent parallel composition of the first path condition and the second path condition by scheduling the first branch and the second branch to execute in parallel;
refactoring source code of the program by placing code pieces of the first branch and the second branch into separate execution units; and
executing the code related to the first branch separately from the code related to the second branch.

15. One or more computer-readable non-transitory storage media embodying software operable when executed by one or more computer systems to:
symbolically execute a software module having a number of execution paths;
losslessly reduce the number of execution paths during the symbolic execution of the software module;
represent the software module using a Control Flow Graph;
wherein losslessly reducing the number of execution paths during the symbolic execution of the software module comprises:
identifying a first path condition and a second path condition forming a sequential composition in the Control Flow Graph;
performing dependency analysis for the first path condition and the second path condition;
determining that the first path condition and the second path condition are independent of each other; and
based on the determination that the first path condition and the second path condition are independent of each other:
converting the sequential composition into an equivalent parallel composition of the first path condition and the second path condition; and
ignoring any duplicate path in the parallel composition.

16. The media of claim 15, wherein losslessly reducing the number of execution paths during the symbolic execution of the software module further comprises:
traversing a first execution path through the Control Flow Graph, comprising:
recording each node that has been visited along the first execution path; and
at each branching node along the first execution path, selecting a branch that leads to a unvisited node before selecting a branch that leads to a visited node; and
ignoring a second execution path through the Control Flow Graph where all nodes along the second execution path have been visited.

17. The media of claim 15, wherein losslessly reducing the number of execution paths during the symbolic execution of the software module comprises:
merging a first execution path and a second execution path through the Control Flow Graph into a single third execution path using a decision procedure;
using native constructs in the decision procedure to combine a first symbolic expression representing the first execution path and a second symbolic expression representing the second execution path into a single third symbolic expression representing the third execution path; and
modeling the first execution path and the second execution path through the native constructs and through built-in theories of the design procedure.

18. The media of claim 15, wherein losslessly reducing the number of execution paths during the symbolic execution of the software module further comprises:
identifying a first path condition and a second path condition that are related to each other in the Control Flow Graph through symbolic analysis of the first path condition and the second path condition, yielding a dependency between the first path condition and the second path condition;
grouping a first branch resulting from the first path condition and a second branch resulting from the second path condition by moving the second branch ahead of a third branch located between the first branch and the second branch;
determining the feasibility of a path condition of the second branch over a path condition of the first branch; and
pruning execution paths before execution of the third branch.

19. The media of claim 15, wherein losslessly reducing the number of execution paths during the symbolic execution of the software module comprises:
identifying a unvisited node in the Control Flow Graph;
identifying an execution path through the Control Flow Graph by traversing backward, instruction-by-instruction, through the Control Flow Graph, starting at the unvisited node and ending at a root node of the Control Flow Graph;
interpreting, through variable substitution, each instruction encountered during the traversing backward; and
updating the heap, stack and path conditions with the symbolic expressions obtained through the variable substitution.

20. The media of claim 15, wherein during the symbolic execution of the software module, the number of execution paths is reduced without losing coverage of the software module.

21. The media of claim 15, wherein losslessly reducing the number of execution paths during the symbolic execution of the software module further comprises:
performing dependency analysis and coverage target analysis for the first path condition and the second path condition;
determining whether the first path condition and the second path condition share no variables;
determining whether the a first branch and a second branch lead to different coverage targets, the first branch resulting from the first path condition and the second branch resulting from the second path condition;
determining that the first path condition and the second path condition are independent of each other based upon a determination that the first path condition and the second path condition share no variables or upon a determination that the first path condition and the second path condition lead to different coverage targets;
based on the determination that the first path condition and the second path condition are independent of each other:
converting the sequential composition into an equivalent parallel composition of the first path condition and the second path condition by scheduling the first branch and the second branch to execute in parallel;
refactoring source code of the program by placing code pieces of the first branch and the second branch into separate execution units; and
executing the code related to the first branch separately from the code related to the second branch.

22. A system comprising:

means for symbolically executing a software module having a number of execution paths;
means for losslessly reducing the number of execution paths during the symbolic execution of the software module;
means represent the software module using a Control Flow Graph;
wherein means for losslessly reducing the number of execution paths during the symbolic execution of the software module comprises:
  means for identifying a first path condition and a second path condition forming a sequential composition in the Control Flow Graph;
  means for performing dependency analysis for the first path condition and the second path condition;
  means for determining that the first path condition and the second path condition are independent of each other; and
  means for, based on the determination that the first path condition and the second path condition are independent of each other:
    converting the sequential composition into an equivalent parallel composition of the first path condition and the second path condition; and
    ignoring any duplicate path in the parallel composition.

* * * * *